(12) United States Patent
Xiao et al.

(10) Patent No.: US 9,485,075 B2
(45) Date of Patent: Nov. 1, 2016

(54) METHOD AND SYSTEM FOR TRANSMISSION AND RECEPTION OF SIGNALS AND RELATED METHOD OF SIGNALING

(75) Inventors: Weimin Xiao, Hoffman Estates, IL (US); Brian Classon, Palatine, IL (US); Bingyu Qu, Schaumburg, IL (US)

(73) Assignee: Futurewei Technologies Inc., Plano, TX (US)

(*) Notice: Subject to any disclaimer, the term of this patent is extended or adjusted under 35 U.S.C. 154(b) by 0 days.

(21) Appl. No.: 13/458,672

(22) Filed: Apr. 27, 2012

(65) Prior Publication Data

US 2013/0003668 A1    Jan. 3, 2013

Related U.S. Application Data

(60) Provisional application No. 61/480,979, filed on Apr. 29, 2011.

(51) Int. Cl.
  *H04L 5/00*    (2006.01)
  *H04W 48/12*   (2009.01)

(52) U.S. Cl.
  CPC ............ *H04L 5/0098* (2013.01); *H04L 5/001* (2013.01); *H04L 5/0044* (2013.01); *H04L 5/0053* (2013.01); *H04W 48/12* (2013.01)

(58) Field of Classification Search
  None
  See application file for complete search history.

(56) References Cited

U.S. PATENT DOCUMENTS

| | | |
|---|---|---|
| 2007/0070908 A1 | 3/2007 | Ghosh et al. |
| 2010/0232373 A1 | 9/2010 | Nory et al. |
| 2011/0034175 A1 | 2/2011 | Fong et al. |
| 2011/0070845 A1 | 3/2011 | Chen et al. |
| 2012/0082082 A1* | 4/2012 | Etemad et al. ............ 370/312 |
| 2013/0136015 A1* | 5/2013 | Ojala et al. ............... 370/252 |
| 2013/0258995 A1* | 10/2013 | Skov et al. .............. 370/329 |
| 2015/0078330 A1 | 3/2015 | Nakao et al. |

FOREIGN PATENT DOCUMENTS

| | | |
|---|---|---|
| JP | 2008539667 A | 11/2008 |
| WO | WO 2006/116102 A2 | 11/2006 |

(Continued)

OTHER PUBLICATIONS

"3rd Generation Partnership Project; Technical Specification Group Radio Access Network; Evolved Universal Terrestrial Radio Access (E-UTRA); Physical Channels and Modulation (Release 10)", 3GPP TS 36.211 v10.1.0, Mar. 2011, 103 pages.

(Continued)

*Primary Examiner* — Marcus R Smith
(74) *Attorney, Agent, or Firm* — Slater Matsil, LLP (57) ABSTRACT

A base station (e.g., an evolved Node B) determines whether the physical broadcast channel (PBCH), reference signals (SCH) and common reference signals (CRS) are transmitted (or awaiting transmission) on a secondary component carrier (Scell) with the cell. The determination information is transmitted to a user equipment (UE) to inform the UE that the Scell transmissions do not include PBCH/SCH/CRS. As a result, the resource elements (REs) normally used to carry system information in the PBCH/SCH/CRS can be dynamically assigned (or reassigned) to the data channel. In this manner, the physical downlink shared channel (PBSCH) bandwidth can be increased by utilizing those resource elements that are normally reserved/assigned to the PBCH/SCH/CRS.

20 Claims, 5 Drawing Sheets

(56) References Cited

FOREIGN PATENT DOCUMENTS

WO WO 2010/016221 A1 2/2010
WO WO 2011/038252 A2 3/2011

OTHER PUBLICATIONS

"3rd Generation Partnership Project; Technical Specification Group Radio Access Network; Evolved Universal Terrestrial Radio Access (E-UTRA); Multiplexing and channel coding (Release 10)", 3GPP TS 36.212 v10.1.0, Mar. 2011, 76 pages.
"3rd Generation Partnership Project; Technical Specification Group Radio Access Network; Evolved Universal Terrestrial Radio Access (E-UTRA); Physical layer procedures (Release 10)", 3GPP TS 36.213 v10.1.0, Mar. 2011, 115 pages.
"3rd Generation Partnership Project; Technical Specification Group Radio Access Network; Requirements for Further Advancements for (E-UTRA); (LTE-Advanced) (Release 10)", 3GPP TR 36.913 v8.0.0, Jun. 2008, 14 pages.
3rd Generation Partnership Project; Technical Specification Group Radio Access Network; Evolved Universal Terrestrial Radio Access (E-UTRA); Radio Resource Control (RRC); Protocol specification (Release 10), 3GPP TS 36.331 V10.1.0 (Mar. 2011), 290 pages.
Ericsson, et al., "Remaining Details for CA-based HetNets," 3GPP TSG RAN WG1 Meeting #63bis, R1-110031, Dublin, Ireland, Jan. 17-21, 2011, 4 pages.

\* cited by examiner

METHOD AND SYSTEM FOR TRANSMISSION AND RECEPTION OF SIGNALS AND RELATED METHOD OF SIGNALING

CROSS-REFERENCE TO RELATED APPLICATION

This application claims priority under 35 USC 119(e) to U.S. provisional application Ser. No. 61/480,979, filed on Apr. 29, 2011, and which is incorporated herein by reference.

TECHNICAL FIELD

The present disclosure relates to communications systems and methods and, in particular, to a method and system for transmission and reception of wireless signals and related methods of signaling.

BACKGROUND

According to The Third Generation Partnership Project (3GPP) Technical Specification Group Radio Access Network, Requirements for Further Advancements for E-UTRA (LTE-Advanced or LTE-A), Release-10 (3GPP TR 36.913 V8.0.0 (2008-06)), which is incorporated herein by reference, LTE-Advanced networks should target a downlink (DL) peak data rate of 1 Gbps and an uplink (UL) peak data rate of 500 Mbps. Comparing Release-8 (LTE) to Release-10 (LTE-Advanced), the UL peak data rate has increased from 50 Mbps to 500 Mbps, and the peak downlink (DL) rate has increased up to 1 Gpbs.

One important aspect of LTE-Advanced is the advanced topology network it is intended to provide—heterogeneous networks with a mix of large cells (macro) with small cells (pico, femto, remote radioheads) and relay nodes. As compared to LTE, LTE-A provides the addition of many smaller and lower power nodes or cells and improves capacity and coverage. In order to provide the improved data rates, LTE-Advanced introduces "multicarrier" which refers to the aggregation of multiple carriers to increase data rates and provide more bandwidth for a user device/equipment (UE).

A further enhancement, known as coordinated multiple point transmission/reception (CoMP), may be considered in a future release of LTE, for example Release-11, Release-12 or beyond. With CoMP, a UE can transmit or receive signals from multiple points jointly, where multiple points may be multiple cells or multiple sites, even multiple antennas.

In LTE or LTE-A compliant systems, there exist multiple component carriers for carrier aggregation. In LTE Release-10, each component carrier (CC) is a Release-8 compatible component carrier. In other words, a Release-8 UE has the functionality to transmit and receive data over each component carrier. Hence for each Release-8 compatible component carrier, there are multiple physical/transport channels for each CC in the downlink, including: Physical broadcast channel (PBCH) carrying the broadcast channel (PCH), Physical downlink shared channel (PDSCH) carrying the down-link shared channel (DL-SCH) and paging channel (PCH), Physical multicast channel (PMCH) carrying the multicast channel (MCH), Physical downlink control channel (PDCCH) carrying DCI information, Physical control format indicator channel (PCFICH) carrying HI information, and Physical hybrid ARQ indicator channel (PHICH) carrying CFI information. In addition, there are numerous reference and synchronization signals for each CC in the downlink, including: common reference signal (CRS), channel state information reference signal or channel status indicator reference signal (CSI-RS), positioning reference signal (PRS), demodulation reference signal (DM-RS), primary synchronization signal and secondary synchronization signal, as specified in 3GPP Release-8 specifications, for example, 3GPP TS 36.211, 36.212, 36.213. etc.

In Release-8 and Release-10, the CRS signal is a reference signal that enables the UE to perform channel estimation for demodulation of the PDCCH and other common channels, as well as for measurement and feedback. In Release-10, the CSI-RS signal is introduced and used for Release-10 UEs to measure the channel status, especially for multiple antennas cases. In addition, other feedback information may be based on the measurement of CSI-RS, such as a precoding matrix indicator (PMI), a channel quality indicator (CQI), and a rank indicator (RI) of the precoding matrix. The CSI-RS signals (in Release-10) can support up to eight (8) transmission antennas while the CRS signals (Release-8/9) can only support a maximum of four (4) transmission antennas. The number of CSI-RS antenna ports can be 1, 2, 4 and 8. While supporting the same number of antenna ports as the CRS signal, the CSI-RS signal uses much less overhead due to its low density in time and frequency. The CSI-RS signal pattern is transmitted to the UE using a radio resource controller (RRC) signal and can support up to 8 transmission antennas. The CSI-RS signal is transmitted repeatedly/periodically with a subframe offset.

To reduce the interference caused by the CSI-RS signals of neighbor cells, muting is performed on the PDSCH transmission. In other words, the PDSCH transmission should ideally transmit nothing in the muted resource elements indicated by the muting pattern. Since there is signaling that informs a Release-10 UE of the muting pattern, the UE can discard the muted resource elements in the reception of PDSCH.

The muting pattern is signaled to the UE using a 16-bit bitmap. Each bit represents a 4-port CSI-RS pattern. Bit 1 indicates the 4-port CSI-RS pattern is muted, and bit 0 indicates the 4-port CSI-RS pattern is not muted.

In general terms, orthogonal frequency-division multiple access (OFDMA) provides for the division of frequency bandwidth into multiple subcarriers in the frequency domain. In the time domain, one subframe is divided into multiple OFDM symbols. Each OFDM symbol may have a cyclic prefix to avoid or reduce inter-symbol interference resulting from multiple path delay. One resource element is defined by the time-frequency resource within one subcarrier and one OFDM symbol. Reference signals and other signals such as the data channel (PDSCH) and control channel (PDCCH) are orthogonal and multiplexed in different resource elements in the time-frequency domain. The signals are modulated and mapped into resource elements (an inverse Fourier transform per each OFDM symbol transforms signals in the frequency domain into signals in time domain).

When carrier aggregation is utilized, the UE and eNodeB communicate using two or more component carriers (CC). Each component carrier is also referred to as a "cell." For purposes of reference, the term Primary Cell (PCell) includes the cell operating in the primary frequency (component carrier) in which the UE either performs the initial connection establishment procedure or initiates the connection re-establishment procedure, or the cell indicated as the primary cell in a handover procedure. The term Secondary Cell (SCell) includes the cell operating on a secondary frequency (component carrier) which may be configured once a PCell with the UE is established and which may be used to provide additional radio resources.

Once established, the Pcell connection may be used to signal system information and cell ID information to the UE for setup of an Scell. In a heterogeneous-type network, this Scell may be interfered with by other cells resulting in a failure of the UE to detect the Scell's synchronization signals. The Pcell may signal the UE that the synchronization information (and cyclic prefix information) of the Pcell can also be used for the Scell.

However, this previous system design assumes a physical broadcast channel (PBCH), synchronization signals (SCH), and/or CRS signals (CRS) are always broadcast on the secondary component carrier.

SUMMARY

According to the present disclosure, there is provided a method for signaling information to a wireless communications device (UE). A primary component carrier cell (Pcell) associated with a first component carrier (CC) is established between a base station and the UE, the Pcell associated with a first component carrier (CC). Determination information is transmitted from the base station to the UE via the Pcell, the determination information identifying a secondary component carrier cell (Scell) associated with a second CC and operable for indicating to the UE the absence of at least a one of the following in the Scell: a physical broadcast channel (PBCH), one or more synchronization signals (SCH), or one or more cell-specific reference signals (CRS). User data is transmitted to the UE within one or more resource elements normally associated with at least one of the following in the Scell: the PBCH, the SCH or the CRS.

According to another embodiment of the present disclosure, there is provided a base station for signaling information and transmitting data to a wireless communications device (UE). The base station includes a transmitter, one or more antennas, and a processor. The processor is operable to establish a primary component carrier cell (Pcell) associated with a first component carrier (CC) between the base station and the UE, determine whether a secondary carrier cell (Scell) established or to be established by the base station includes one or more of at least a one of the following in the Scell: a physical broadcast channel (PBCH), one or more synchronization signals (SCH), or one or more cell-specific reference signals (CRS), transmit determination information from the base station to the UE via the Pcell, the determination information identifying the Scell and indicating to the UE the absence of at least one of the following in the Scell: the PBCH, the SCH or the CRS, and transmit user data within one or more resource elements normally associated with at least one of the following in the Scell: the PBCH, the SCH or the CRS.

According to yet another embodiment of the present disclosure, there is provided a method for dynamically assigning (or reassigning) resource elements (REs) within a secondary component carrier cell (Scell) in a wireless communication system. The method includes establishing a primary component carrier cell (Pcell) between an evolved Node-B (eNodeB) and the UE in which the Pcell is associated with a first component carrier (CC), and generating determination information by the eNodeB indicating that the Scell does not include one or more of: a broadcast channel assigned a first set of predefined REs, synchronization signals assigned a second set of predefined REs, or reference signals assigned a third set of predefined REs. The eNodeB transmits the determination information to the UE via the Pcell and one or more of the REs within one of the first set, the second set or the third set of predefined REs is assigned (or reassigned) to a physical downlink shared channel of the Scell enabling the RE to carry data to the UE. The method further includes transmitting data within the one or more assigned (or reassigned) REs via the Scell to the UE.

Other technical features may be readily apparent to one skilled in the art from the following figures, descriptions, and claims.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION

The construction and practice of various embodiments are discussed in detail below. It should be appreciated, however, that the present disclosure provides many applicable inventive concepts that can be embodied in a wide variety of specific contexts. Though specific embodiments discussed herein are merely illustrative of specific ways to make and practice the teachings and technology herein, they do not limit the scope of this disclosure.

Figure 1:
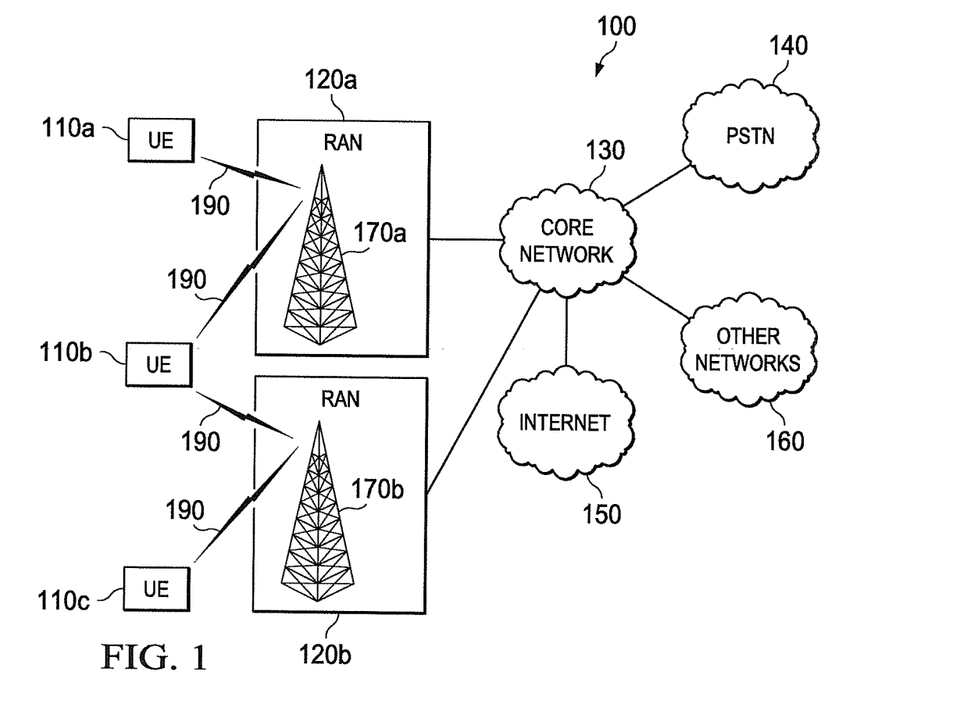
FIG. 1 is a system block diagram of a communication system in which one or more embodiments described herein may be implemented.

Turning to FIG. 1, there is shown an overall block diagram of an example communications system 100 in which one or more embodiments may be implemented. The system 100 enables multiple wireless users to transmit and receive data and content, and may implement one or more channel access methods, such as code division multiple access (CDMA), time division multiple access (TDMA), frequency division multiple access (FDMA), orthogonal FDMA (OFDMA), single-carrier FDMA (SC-FDMA), and other channel access protocols.

The communications system 100 includes UEs 110*a*, 110*b*, 110*c*, first and second radio access networks (RANs) 120*a*, 120*b*, a core network 130, a public switched telephone network (PSTN) 140, the Internet 150, and other networks 160. Any type and number of these components or elements may be included in the system 100. The UEs 110 are configured to operate and/or communicate in the system 100. By way of example, UEs 110 may be configured to transmit and/or receive wireless signals, and may include such devices (or may be referred to) as a user equipment/ device (UE), wireless transmit/receive unit (WTRU), a mobile station, a fixed or mobile subscriber unit, a pager, a cellular telephone, a personal digital assistant (PDA), a smartphone, a laptop, a computer, a touchpad, a wireless sensor, consumer electronics, etc.

As shown in FIG. 1, the system 100 also includes multiple base stations 170a and 170b. Each base station is configured to wirelessly interface with one or more of the UEs 110 to enable access to the core network 130, the PSTN 140, the Internet 150, and/or the other networks 160. For example, the base stations 170a, 170b may include (or be) one or more of several well-known devices, such as a base transceiver station (BTS), a Node-B (NodeB), an evolved Node B (eNodeB), a Home Node B, a Home eNode B, a site controller, an access point (AP), and a wireless router.

In the embodiment shown, the base station 170a forms part of the RAN 120a which may include other base stations, elements and/or devices, while the base station 170b forms part of the RAN 120b which may include other base stations, elements and/or devices. Each base station 170a, 170b operates to transmit/receive wireless signals within a particular geographic region or area, sometimes referred to as a "cell". In addition, multiple-input multiple output (MIMO) technology may be employed having multiple transceivers for each cell.

The base stations 170a, 170b communicate with one or more of the UEs 110 over one or more air interfaces (identified by reference numeral 190) using a wireless communication link. The air interfaces 190 may utilize any suitable radio access technology.

It is contemplated that the system 100 may use multiple channel access functionality, including such schemes as described above. In the embodiment, the base stations and the UEs implement LTE and/or LTE-A. As will be understood, other multiple access schemes and wireless protocols may be utilized.

Both RANs 120a, 120b are in communication with the core network 130 to provide the UEs with voice, data, applications, and/or voice over internet protocol (VoIP) services. Understandably, the RANs 120 and/or the core network 130 may be in direct or indirect communication with one or more other RANs (not shown). The core network 130 may also serve as a gateway access for the other networks (PSTN 140, Internet 150, other networks 160). In addition, some or all of the UEs 110 may include functionality for communicating with different wireless networks over different wireless links using different wireless technology and/or protocols.

Figure 2:
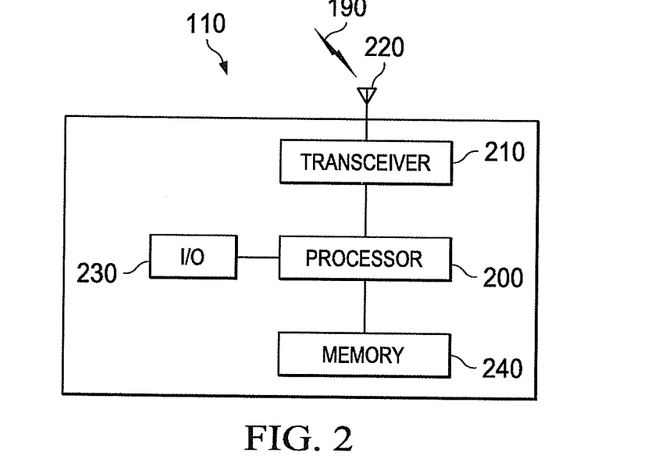
FIG. 2 is an overall block diagram illustrating a UE shown in FIG. 1.

Turning now to FIG. 2, there is shown an overall block diagram of an example UE 110. The UE 110 includes a processor 200, a transceiver 210, an antenna element 220, one or more input/output devices 230 (e.g., speaker/microphone, keypad, display/touchpad) and memory 240. The UE 110 may include one or more other components, devices, or functionalities (not shown). It will be understood that the UE 110 may include fewer or more of the foregoing described elements.

The processor 200 may be a general purpose, special purpose or digital signal processor, and may be a plurality of processors or combination of such processors. The processor 120 includes functionality to perform signal coding, data processing, power control, input/output processing, and/or any other functionality enabling the UE 110 to operate in the system 100. The processor 200 is coupled to the transceiver 210 which is coupled to the antenna element 220. It will be understood that the processor 200 and the transceiver 210 may be separate components or integrated together. Similarly, the antenna element 220 may be a single element or a number of elements (multiple antennas or elements).

The transceiver 210 is configured to modulate the data or signals for transmission by the antenna 220 and demodulate the data or signals received by the antenna 220.

The processor 200 is coupled to the one or more input/ output devices 230 (including ports or busses) operable for inputting/outputting user data. In addition, the processor 200 is coupled to memory 230 operable for storing and retrieving data. Any suitable type of memory storage device may be included, such as random-access memory (RAM), read-only memory (ROM), hard disk, subscriber identity module (SIM) card, a memory stick, a secure digital (SD) memory card, and the like.

Other elements or devices that might be included within in the UE 110 will not be described herein, unless necessary or relevant to an understanding of the present disclosure.

Figure 3:
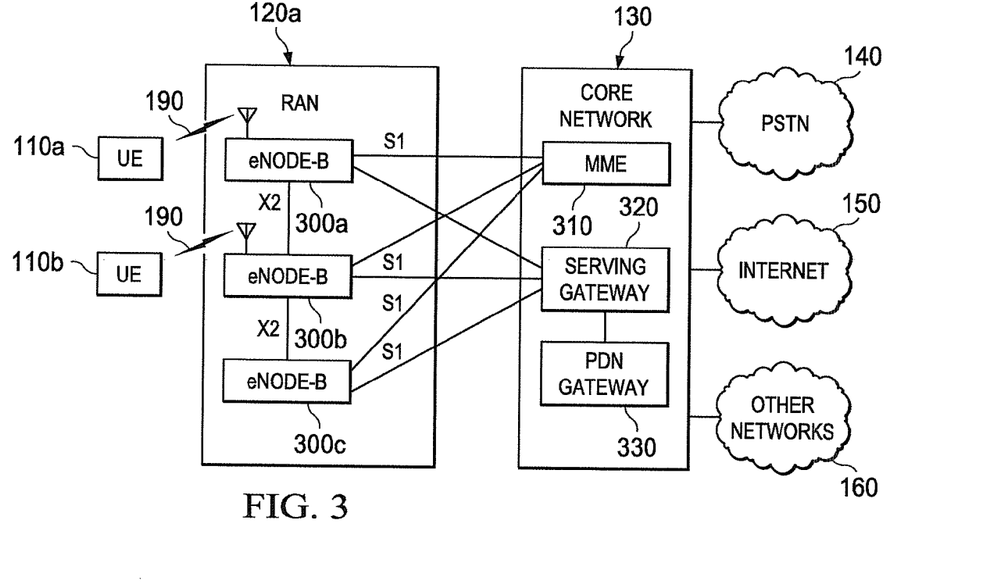
FIG. 3 is an overall block diagram illustrating an evolved Node B (eNodeB) shown in FIG. 1.

Now turning to FIG. 3, there is illustrated a system diagram of the RAN 120a and the core network 130 according to an embodiment of the present disclosure. In this embodiment, the RAN 120a employs LTE-A radio access interface technology to communicate with the WTRUs 110a, 110b over the air interface 190. The RAN 120a is also in communication with the core network 130b, and may be in communication with the RAN 120b (though RAN 120b is not shown in FIG. 3).

As shown, the RAN 120a includes one or more eNodeBs, such as eNodeBs 300a, 300b, 300c. Each of the eNodeBs include one or more transceivers for communicating with the UEs over the air interface 190. In one embodiment, the eNodeBs implement MIMO technology using multiple antennas to transmit/receive wireless signals to/from UEs 110a, 110b.

For ease of reference, the following description will focus on the interaction of eNodeB 300a and the UE 110a. The eNodeB 300a is associated with one or more cells (not shown), each cell potentially including different carrier frequencies or component carriers (CC), and being configured to handle typical eNodeB functions, such as radio resource management decisions, handover decisions, scheduling of users in the uplink and/or downlink. As shown in FIG. 3, the eNodeBs may communicate with one another over an X2 interface.

The core network 130 may include a mobility management gateway (MME) 310, a serving gateway 320, and a packet data network (PDN) gateway 330. The MME 310 is connected to each eNodeB in the RAN 120a via an S1 interface and serves as a control node that may be responsible for authenticating users of the UEs, bearer setup/ configuration/release, and selection of a particular serving gateway during an initial acquisition of the WTRUs. The MME may also provide a control plane function for switching between the RAN 120a and other RANs (not shown).

The serving gateway 320 is connected to each of the eNodeBs via the S1 interface and routes and forwards user data packets to/from the UEs. The serving gateway 320 may perform other functions, such as anchoring user planes during inter-eNodeB handovers, triggering paging when downlink data is available for the UEs and managing and storing contexts of the UEs. The serving gateway 144 may also be coupled to the PDN gateway 330 which provides the UEs with access to other packet-switched networks, such as the Internet 150, to facilitate communication.

The core network 130 may also facilitate communications with other networks, such as between the UEs and circuit-switched networks (the PSTN 140) to conventional land-line communications devices.

Figure 4:
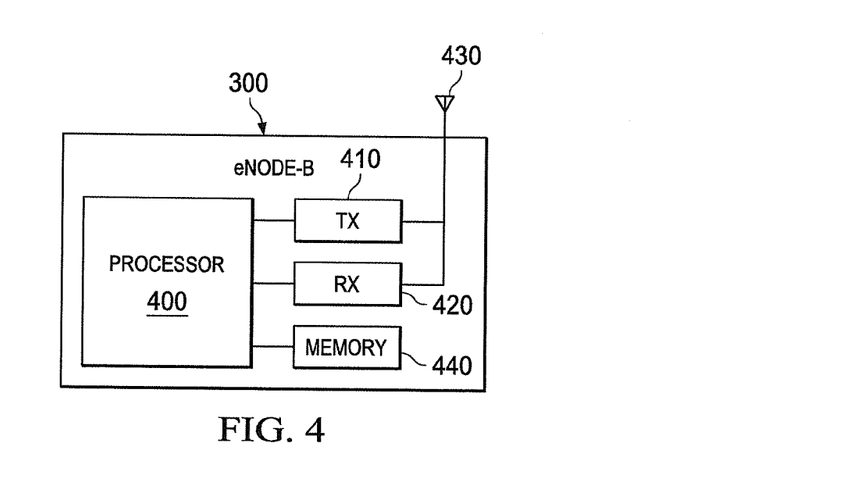
FIG. 4 illustrates an example system diagram of RANs and the core network according to an embodiment of the present disclosure.

Now turning to FIG. 4, there is a block diagram of an example eNodeB 300 having a processor 400, a transmitter 410, a receiver 420, an antenna 430 and memory 440. Additional suitable components or devices may be included (but not shown). The antenna 430 may include one or more antennas and/or one or more elements (multiple antennas or elements).

The configuration and operation of the eNodeB 300 is readily known and understood by those of ordinary skill in the art, and no further description or explanation of its structure or operation will be provided herein unless necessary for an understanding of the present disclosure or except for new or additional functionality proposed herein.

For reference in this document, the term "Component Carrier (CC)" includes a frequency on which the UEs (and eNodeBs) operate.

A UE may receive transmissions on a downlink (DL) CC. A DL CC may include one or more DL physical channels with transport channels mapped thereon (as described in the BACKGROUND section above).

On the PCFICH, the UE receives control data indicating the size of the control region of the DL CC. On the PHICH, the UE may receive control data indicating hybrid automatic repeat request (HARQ) acknowledgement/negative acknowledgement (ACK/NACK) feedback for a previous uplink transmission. On the PDCCH, the UE receives DCI messages that are mainly used for scheduling downlink and uplink resources. On the PDSCH, the UE may receive user and/or control data.

A UE may transmit transmissions on an uplink (UL) CC. An UL CC may include one or more UL physical channels, such as the physical uplink control channel (PUCCH) and the physical uplink shared channel (PUSCH). On the PUSCH, the UE may transmit user and/or control data. On the PUCCH, and in some cases on the PUSCH, the UE may transmit uplink control information, (such as channel quality indicator/precoding matrix index/rank indication (CQI/PMI/RI) or scheduling request (SR)), and/or HARQ ACK/NACK feedback. On a UL CC, the UE may also be allocated dedicated resources for transmission of Sounding Reference Signals (SRS).

A "cell" is described as a DL CC which is, optionally, linked to a UL CC based on the system information (SI) received by the UE. This SI is either broadcast on the DL CC or transmitted using dedicated configuration signaling from the network. For example, when broadcast on the DL CC, the UE may receive the uplink frequency and bandwidth of the linked UL CC as part of the SystemInformationBlock-Type2 (SIB2) information element.

For purposes of reference, the term Primary Cell (PCell) includes the cell operating in the primary frequency (component carrier) in which the UE either performs the initial connection establishment procedure or initiates the connection re-establishment procedure, or the cell indicated as the primary cell in a handover procedure. The term Secondary Cell (SCell) includes the cell operating on a secondary frequency (component carrier) which may be configured once an RRC connection is established and which may be used to provide additional radio resources.

Typically, a compatible component carrier (CC) serves as a primary cell (Pcell) and a compatible CC serves as a secondary cell (Scell). In Release-10, the Scell may be assumed to have the same system frame number as the Pcell or the same time/frequency synchronization as the Pcell, hence the time/frequency synchronization can be obtained and/or maintained by monitoring the Pcell by a UE. Therefore, the PDCCH information in the Pcell can be used for scheduling the PDSCH in the Scell, which is cross-carrier scheduling defined in Release-10 in case of carrier aggregation scenario.

In Release-10, Scell setup information (e.g., cell-ID of Scell, center frequency of Scell component carrier, antenna port information) is transmitted to the UE using the component carrier of the Pcell. In a heterogeneous-type network, the synchronization signals of the Scell may be undetectable due to interference by neighboring cells. In 3GPP RAN1 contribution R1-110031, a compatible component carrier Scell having severe interference from neighboring cells (e.g., a macro cell using the same CC for its Pcell) is introduced. The Scell cannot be accessed by a Release-8/Release-10 UE based on detection of the synchronization signals (SCH) and decoding of PBCH (since the SCH/PBCH signals/channels may be interfered with). Hence various proposals were introduced in R1-110031 to signal the cyclic prefix length (normal or extended) and the reference cell for time/frequency synchronization of the severely interfered Scell to the UE through the UE's Pcell.

For a UE with the capability to communicate using non-compatible CCs, for example, a Release-11 or beyond UE, the Scell can be configured flexibly for better spectrum efficiency by removing some overhead, or to have a flexible bandwidth configuration instead of one of six defined values in Rel-8, 1.4 MHz(6 RBs), 3 MHz(15 RBs), 5 MHz(25 RBs), 10 MHz(50 RBs), 15 MHz(75 RBs), and 20 MHz(100 RBs). However, in the event the Scell needs to serve a legacy UE (Release-8 or Release-10), there will be some constraint on the configuration of bandwidth/channels in the Scell. In other words, the CC of the Scell will likely need to include all of the PBCH/SCH/CRS channels/signals. Otherwise, a legacy UE may not be able to use the Scell for data transmission and/or reception.

Accordingly, the present disclosure provides a method and system for signaling to inform the UE whether the CC of an Scell includes PBCH/SCH/CRS channels/signals. As will be appreciated, the term "PBCH/SCH/CRS channels/signals" can refer to all or a portion of any of the channel(s) or signal(s), unless specifically expressed otherwise.

In the event that the Scell CC does not include the PBCH/SCH/CRS channels/signals, the resource elements normally associated with these channels/signals may be allocated for the transmission of user data (or other information) to the UE. According to the LTE and LTE-A specifications, each of the PBCH, SCH and CRS are assigned or allocated a predefined set of resource elements within an LTE DL frame. If the CC does include the PBCH/SCH/CRS channels/signals, the UE will operate conventionally (e.g., Release-8, Release-10), in other words, resources (e.g., the predefined resource elements) of PBCH/SCH/CRS are reserved (and used) for the PBCH/SCH/CRS. If the network informs the UE whether there is a PBCH/SCH/CRS, then the UE will interpret the legacy resource allocation signaling carried in PDCCH accordingly. Thus, the present disclosure proposes to dynamically configure PBCH/SCH/CRS for a UE based on different situations, such as when a synchronization detection is needed or a PBCH/SCH/CRS is needed for keeping compatibility to some legacy UE in the secondary cell. Legacy UEs always assume that the PBCH/SCH/CRS resource elements are reserved for PBCH/SCH/CRS. Hence, for legacy UEs, the PBCH/SCH/CRS resources cannot be used for other data transmission.

For a UE inoperable with a non-compatible Scell (currently a Release-10 UE is assumed to work with a compatible Scell only), the UE can assume the Scell has legacy channels/signals (i.e., PBCH/SCH/CRS channels/signals) even though PBCH/SCH cannot be used for synchronization acquisition and cell identification in the heterogeneous-type network topology (as previously described). For a UE with the capability to operate with the non-compatible Scell, a more efficient way to use Scell is possible.

In Release-10, the center frequency of a Scell (CC), physical cell-id, antenna port information and bandwidth information are transmitted to the UE using RRC (radio resource control) signaling, in other words, through the RRC connection established by the Pcell. In Release-10, the DC subcarrier is always the same as the center frequency of the bandwidth of a CC (or cell) for a UE, and hence a signaling of center frequency and the bandwidth size of a CC (or cell) are enough for a UE to determine the actual frequency resource in Release-10. In addition, CRS signals in the Scell may be used for RRM (Radio resource management) measurement such as RSRS/RSPQ measurement defined in 36.214, or RLM (Radio link failure monitor) measurement by a Release-10 UE. Therefore, CRS signals are necessary for a legacy UE to use the Scell.

On the contrary, for a Release-11 or beyond UE, it may be possible for only the DMRS and CSI-RS to be configured for measurement and/or channel estimation, while CRS is not necessary. This would reduce overhead. As a result, a scheme to consider both the support of a legacy UE and the efficiency of using Scells is contemplated herein.

Figure 5:
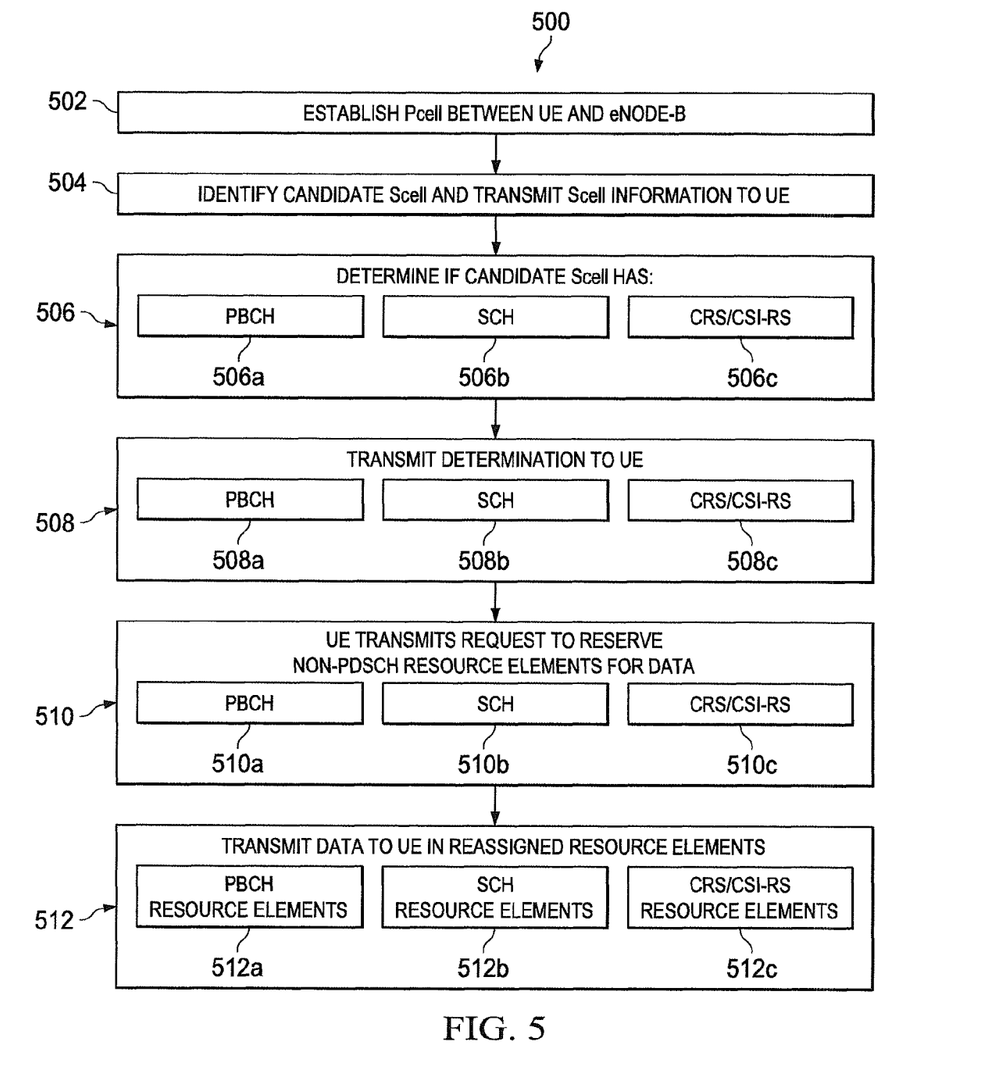
FIG. 5 is a flow diagram of a process for dynamically allocating resource elements in accordance with the present disclosure.

Now turning to FIG. 5, there is shown a flow diagram illustrating a process 500 in accordance with one embodiment of the present disclosure. The process 500 dynamically allocates non-PDSCH resource elements, for example, PBCH/SCH/CRS resource elements, as PDSCH resource elements in an Scell for carrying additional data (i.e., non PBCH/SCH/CRS data).

The UE 110a and eNodeB 300a establish a Pcell connection associated with a first carrier component (step 502). A candidate Scell associated with a second carrier component (for aggregation with the Pcell) is identified and relevant Scell identifying information (e.g., component carrier (CC), physical cell-id, antenna port information, bandwidth information) is transmitted to the UE 110a (step 504). As will be appreciated, some or all of this information may be conveyed during subsequent transmissions to the UE 110a.

The eNodeB 300a makes the following determination(s) about the candidate Scell (step 506): (1) whether PBCH is needed or required (step 506a), (2) whether SCH is needed or required (step 506b), and/or (3) whether CSR/CSI-RS is needed or required (step 506c). In this step or in a different step, the eNodeB 300a may also send the UE 110a information identifying a particular bandwidth the UE 110a is allocated in the event the entire bandwidth is not to be allocated (see, discussion further below relating to partial allocation of Scell bandwidth).

In one embodiment, if a legacy UE needs to be supported by the Scell, then inclusion of the PBCH, SCH and CRS/CSI-RS in the Scell may be required. A legacy UE is defined as a UE that supports operation with a compatible component carrier in accordance with Release-8/10 of the LTE specifications. Legacy UEs to be supported can include legacy UEs currently operating in a Scell with the eNodeB 300a or a legacy UE awaiting connection to the eNodeB through the Scell (e.g., a legacy UE already operating in a Pcell but requesting additional bandwidth).

In one embodiment, the eNodeB 300a transmits this information to the UE 110a via the existing Pcell (step 508). In operation, the UE 110a is notified whether the given Scell includes the PBCH (step 508a), the SCH (step 508b) and/or the CRS/CSI-RS (step 508c). In this example, the UE 110a is a UE that supports both non-compatible and compatible component carriers (e.g., Release-11 and beyond). As will be appreciated, the eNodeB determination step (step 506) may be processed as multiple steps or a single step, and all or only some of the illustrated 506a-c steps may be performed. Similarly, transmission of the determination information to the UE 110a (step 508) may be processed as multiple steps or a single step, and all or only some of the illustrated 508a-c steps may be performed.

Transmission of the determination information (steps 508a-c) from the eNodeB 300a to the UE 110a may be implemented using higher layer signaling (such as MAC signaling or RRC signaling). Thus, the eNodeB 300a signals to the UE 110a whether the PBCH, SCH and/or CRS/CSI-RS are present or not (or will be present or not) in the component carrier of the given Scell.

In one embodiment, RRC signaling is implemented due to its higher reliability in the form of dedicated or broadcast signaling. For example, in broadcast signaling, the eNodeB 300a may transmit this information within the Master Information Block (MIB) or System Information Block (SIB) in the existing Pcell. Other portions of the existing Pcell may be used as well. In another embodiment, dedicated signaling provides added flexibility and may be implemented using dedicated RRC signaling.

If the information received at the UE 110a indicates the Scell includes the PBCH, the SCH and the CRS/CSI-RS, then the UE 110a may conventionally receive and utilize the PBCH, the SCH and the CRS/CSI-RS within the operating Scell (not shown in FIG. 5).

Otherwise, the information (i.e., no PBCH/SCH/CRS for the Scell) received at the UE 110a can indicate that the resource elements normally or statically reserved for the PBCH, the SCH and/or CRS/CSI-RS are available to carry user data or other information from the eNodeB 300a to the UE 110a.

Optionally, the UE 110a may generate and forward a request to the eNodeB 300a for reserving/identifying one or more of these non-PDSCH resource elements for transmission of data to the UE 110a (step 510). In other words, the UE 110a may request that the eNodeB 300a dynamically assign (or reassign) non-PDSCH resource elements, such as those specific resource elements defined by Release 8/10 to carry the PBCH, the SCH and/or the CSR/CSI-RS. As shown, the UE 110a may transmit (and the eNodeB 300 may receive) a request for reserving/identifying one or more of the PDCH resource elements for transmission of data to the UE 110a (step 510a). Similarly, the UE 110a may transmit (and the eNodeB 300a may receive) a request for reserving/identifying one or more of the SCH resource elements for transmission of data to the UE 110a (step 510b), and the UE 110a may transmit (and the eNodeB 300a may receive) a request for reserving/identifying one or more of the CSR/CSI-RS resource elements for transmission of data to the UE 110a (step 510c). As will be appreciated, the step 510 is optional and is not necessary. This step may be utilized when it is desired for the UE itself to identify and reserve some of these resource elements.

The eNodeB 300a may transmit (and the UE 110a may receive) data on PBCH resource elements normally belonging to the PBCH (step 512a). Similarly, the eNodeB 300a may transmit (and the UE 110a may receive) data on SCH resource elements belonging to the SCH (step 512b), and the eNodeB 300a may transmit (and the UE 110a may receive) data on CSR/CSI-RS resource elements belonging to the CSR/CSI-RS (step 512c). This "data" may be user traffic data or other system information data that is normally not included within these predefined resource elements. In one embodiment, the data transmitted by the eNodeB 300a is user traffic data normally transmitted within the DL-SCH transport channel on the physical downlink shared channel (PDSCH).

As will be appreciated, each of the UE request to reserve step (step 510, optional) and the eNodeB data transmission step (step 512) may be processed as multiple steps or a single step, and all or only some of the illustrated 510a-c steps and 512A-c steps may be performed.

From another perspective, the present disclosure increases the number of resource elements utilized for the PDSCH. This is implemented by using resource elements of the PBCH/SCH/CRS to carry data normally carried in the PDSCH. Thus, the normally static number of resource elements within the PDSCH is increased by dynamically using the resource elements of the PBCH/SCH/CRS.

For purposes of this disclosure, the term "assigned" or "reassigned" or "reallocated" or "redefined" resource element refers to a resource element defined statically in accordance with LTE Release-8/10 to carry PBCH/SCH/CRS data (or not previously defined or assigned) that now (in accordance with the teachings of this disclosure) dynamically carries data other than the PBCH/SCH/CRS data. Additionally, the term "PBCH/SCH/CRS resource element" refers to any one of the resource elements statically specified within the LTE Release-8/10 to carry the downlink broadcast channel (PBCH), synchronization signals (SCH) and the reference signals (CRS/CSI-RS).

As will be appreciated, additional signaling may be included within these assigned (or reassigned) resource elements to identify whether only a portion of the additional resource elements are allocated (by the eNodeB) to the UE 110a and, if so, what portion. In another embodiment, the UE may also reserve certain of these resource elements (see step 510 above) itself. For example, different portions of the assigned (or reassigned) resource elements may be allocated to different UEs.

The present disclosure additionally provides further benefits and teachings that may be optionally utilized in the system 100. For Release-11 and beyond UEs, one or more CSI-RS patterns of a CC may be signaled to the UE. For a legacy UE, however, only one CSI-RS pattern can be signaled to the UE for a component carrier. If there are more than one CSI-RS patterns for a UE for a component carrier, it may not be necessary to have the same scrambling code determined by a cell-ID, for example, the cell-ID of the Scell. On the contrary, the CSI-RS patterns may correspond to multiple IDs. For example, a signaled CSI-RS pattern for the UE may be a CSI-RS pattern of another neighboring cell. In that case, the CSI-RS pattern is scrambled by a scrambling code determined by the cell-ID of a neighboring cell. Therefore, the informed ID for determining the scrambling code or frequency shift of the CSI-RS pattern may have the same value as the cell-ID of a neighboring cell. Since the ID for determining the scrambling code of a CSI-RS pattern may not be related with a real cell, or may be related with a real cell but the UE does not need to know, we refer to the ID used to determine the scrambling code of the CSI-RS pattern a "virtual" cell-ID. The generation method of scrambling code for a ID of CSI-RS pattern is that same as in Release-8 to generate scrambling code of CSI-RS from the cell-ID with the same value as the ID of CSI-RS pattern.

For the CRS, a similar scheme can be applied. A signaling may signal to a UE multiple CRS for a component carrier (or cell), which the CRS may be scrambled by multiple scrambling codes determined by multiple IDs. The frequency shift of a CRS pattern may also be determined by an ID. Generally, the method to generate scrambling code from a ID is the same as the scrambling code generated from cell-id in Release-10 to maintain compatibility, in other words, to enable Scell to borrow some CRS/CSI-RS from neighboring LTE-A Release-10 compatible cells, the value(s) of neighboring cell ID(s) may be informed to the UE for generating scrambling code or frequency shift of a CRS/CSI-RS pattern.

In Release-10, the scrambling code is a Gold sequence with the initial phase determined by the cell-ID and symbol/slot/subframe numbers etc for CRS/CSI-RS. The scrambling code is modulated to CRS/CSI-RS signals, which is specified in 3GPP specification.

With the multiple CRS/CSI-RS pattern signaling for a CC, a UE may use the CRS/CSI-RS for measurement (RRM measurement or CSI-RS measurement) or channel estimation for PDSCH, there is no need for the UE to know whether there is a real neighbor cell corresponding to a CRS/CSI-RS pattern or not. In other words, the cell-ID to determine the scrambling code may not the real cell-ID from the UE viewpoint but may be a virtual cell-ID to generate the scrambling code(s) and/or CRS/CSI-RS patterns. In other words the cell-id may not be an ID for a real cell but a virtual cell-id used for informing the CRS/CSI-RS patterns for a UE to implement CoMP. Since the UE has the information of multiple CRS/CSI-RS, for example, the UE may use CRS for channel estimation or use CSI-RS for channel state information feedback, and the UE may be able to use the antennas corresponding to the multiple CRS/CSI-RS for downlink transmission. Particularly, the UE may use multiple antennas corresponding to the CRS for transmission diversity of control channel such as space frequency block coding (SFBC) or space time block coding (STBC).

Figure 6:
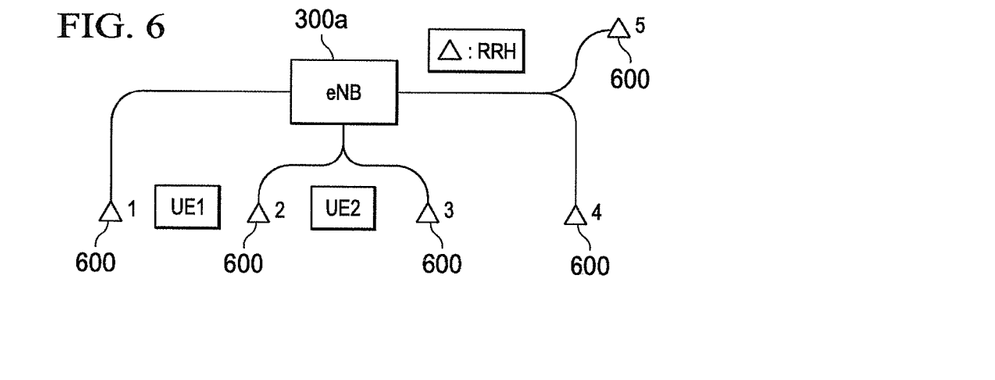
FIGS. 6 and 7 illustrate a system cell having an eNodeB and remote radio heads.
Figure 7:
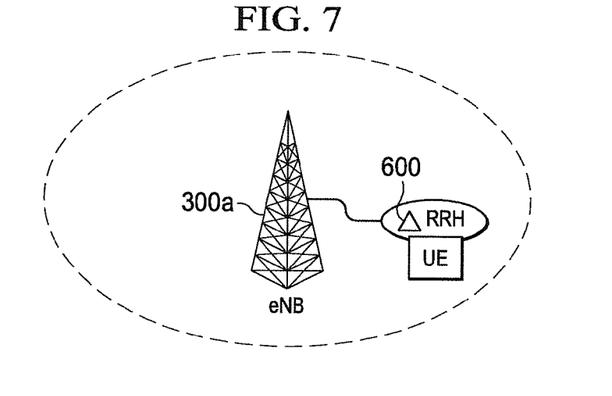

As illustrated in FIGS. 6 and 7, the eNodeB 300a and/or remote radio heads (RRH) 600 may have different cell-IDs, but for the eNodeB 300a and one RRH 600, other CRS/CSI-RS from neighboring RRH/eNodeBs (or cells) can be signaled to a UE in the current cell for cell edge performance improvement.

As for PBSCH and/or SCH (referred hereinafter as PBCH/SCH), a Release-11 or beyond UE may not correctly detect the PBCH/SCH to identify a cell in some scenarios, such as in a heterogeneous network scenario where the cell is severely interfered with by neighboring cells (Macro cell). However, a Pcell may still be able to signal the UE to use the cell as a Scell for data transmission or reception. In a Release-10 system, all component carriers are assumed to be Release-8 compatible component carriers and therefore, these UEs assume there is always a PBCH/SCH when considering resource allocation of PDSCH. In other words, the resource being allocated to PBCH/SCH is reserved and cannot be used for PDSCH transmission. But for Release-11 or beyond UEs, the component carrier may be non-compatible, such as having non-PBCH/SCH or having the PBCH/SCH resource reserved and not used for transmission to avoid interfering with other cells. Thus, signaling to indicate whether a PBCH/SCH is reserved and cannot be used for PDSCH transmission is an important consideration to enable flexible PBCH/SCH configuration of a Scell.

In addition, this signaling may indicate to a UE the bandwidth of the CC allocated for this UE. The frequency position of a DC subcarrier of the CC which is not used for data transmission should be signaled since generally the DC subcarrier results from the hardware implementation limit. To avoid implementation complexity (particularly in the transmitter), a DC subcarrier is needed. The signal may inform the UE of the position of DC subcarrier and the whole system bandwidth of the CC. The whole system bandwidth may be one of six values defined in Release-8 for system bandwidth. The whole system bandwidth of the CC may be useful to negotiate the UE capability and RAN4 RF requirement together with DC subcarrier frequency. Generally, the DC subcarrier of a CC is roughly in the center of the system bandwidth of a CC in Release-10. However, for a UE of Release-11 or beyond, this disclosure further contemplates/proposes allocation of a part of frequency resource for the UE to transmit/receive data or monitor the system. For example, only a part of frequency resource of a CC may be allocated for measurement purposes, hence the UE may assume only using the CRS/CSI-RS in the signaled part of system bandwidth of the cell for measurement. Additionally, only one portion of the whole frequency resource bandwidth of the CC may be allocated to the UE, while other portions are not allocated.

Figure 8:
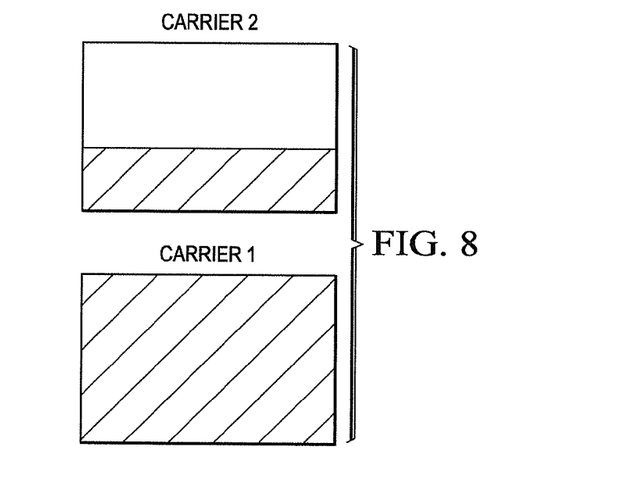
FIG. 8 illustrates resources of two component carriers of a cell, and an example of partial allocation of resource blocks within a secondary CC.

Turning to FIG. 8, two component carriers for a UE are shown—carrier 1 is the primary CC while carrier 2 is the secondary CC. As illustrated, in this example, only the shadowed frequency resource in carrier 2 is allocated to the UE by the system 100.

To signal the allocation to the UE, various suitable methods could be used. One signaling method and resource allocation method may be to signal a start or stop resource block (RB) number together with the bandwidth size of the CC to the UE in terms of an RB number together with the frequency position of a DC subcarrier. For example, the signaling may indicate that the bandwidth of a CC for a UE is from RB n to n+b, where n is starting RB number, and b is the total RB number for this UE.

To maintain compatibility with legacy UEs, the scrambling code in CRS/CSI-RS for the specific bandwidth of a CC (or cell) of the UE should be generated based on the realistic DC subcarrier position and the maximum system bandwidth defined in Release-8.

Figure 9:
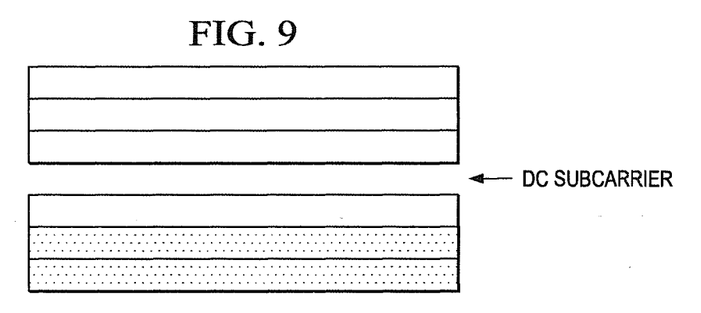
FIG. 9 illustrates another example of partial allocation of resources within a secondary CC.

Another signaling method may be based on bitmap. In other words, a RB or RB group (RBG) can be represented by one or more bits. The bit values determine whether the RB/RBGs are allocated to the UE or not. One example is shown in FIG. 9. The blank part is the center of the DC subcarrier. The frequency position of the DC is signaled to the UE with the whole bandwidth of the system being six RBs (or RBGs) in this example. A signal may indicate the start RB numbered 0, and two RBs (indicated by shading) for resource allocation for this UE. Hence 2 RBs (or RBGs) are the allocated bandwidth for the UE. In this example, we do not assume there will be a virtual DC for the bandwidth of the UE (in fact, there is no need for a virtual DC for the two RBs (RBGs)).

There are some benefits to signaling a specific bandwidth for a UE. For example, a restricted bandwidth for a UE may reduce the overhead in PDCCH to schedule the PDSCH in the restricted bandwidth since less bandwidth means less overhead for resource allocation. Another benefit may be to enable interference coordination. For example, there may be a portion of the frequency resource for cell edge users in a current cell and a neighboring cell may use different frequency resource for cell edge users. Hence for a current cell, two different parts of frequency resource may have different interference. Therefore, signaling two different frequency resources for CRS/CSI-RS may be helpful for interference coordination. For different frequency resource portions allocated for a UE, different CRS/CSI-RS can be configured. By using the same scheme as in Release-8 to generate the scrambling code based on DC subcarrier position and the maximum system bandwidth of one CC, a central portion of the frequency resources including DC subcarrier could be allocated to a Release-10 compatible UE. The maximum system bandwidth is predefined in the specification.

Figure 10:
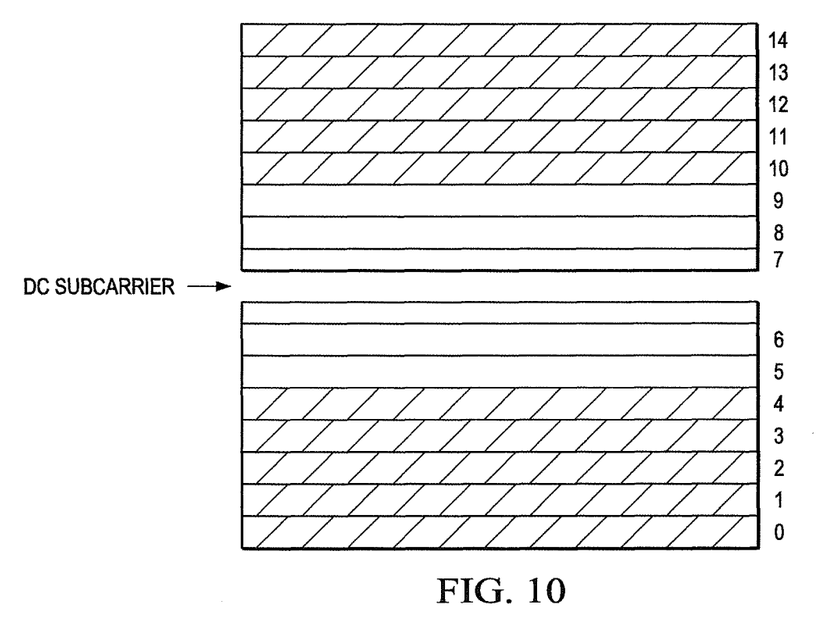
FIG. 10 illustrates yet another example of partial allocation of resources within a secondary CC.

In another embodiment, a UE is signaled a bandwidth to utilize, and there may or may not be a larger system bandwidth to include within the signaled bandwidth for the UE. However, a restricted frequency resource from the allocated bandwidth of the UE could be signaled to the UE for CSI-RS/CRS. In other words, only a part of frequency resources of the bandwidth of the UE is allocated for CSI-RS/CRS. Another example is illustrated in FIG. 10 where RBs numbered from 0 to 14 have been allocated to the UE as its bandwidth. The UE may be signaled that only RBs numbered 0-4 and 10-14 (the shadowed RBs) have the CSI-RS/CRS information, or the UE may assume only in these RBs is there CSI-RS/CRS for measurement or channel estimation.

In another example, only RBs in the center part numbered 5-9 are identified to the UE as having CSI-RS/CRS. If the center part is compatible with Release-8, the center part may have CRS, but other frequency resources may not have CRS even though both frequency resources are signaled as part of bandwidth of this UE. In other words, the CRS or CSI-RS on the extension carrier (Scell) may be in the full bandwidth or a partial bandwidth of the UE. With a restricted bandwidth and/or a restricted CRS/CSI-RS for a UE, this may provide benefits that some frequency resources close to the interference sensitive band (for example, GPS frequency band) can be protected.

Referring again to FIG. 8, only the lower part of the carrier 2 is identified or allocated to the UE for data transmission to avoid interference to the frequency band close to the upper part of carrier 2. For uplink transmission bandwidth, a restricted bandwidth for a UE may reduce uplink interference to a neighbor band. A scheme to inform a UE of a DC subcarrier frequency and a bandwidth where the center frequency of the bandwidth may not be the DC subcarrier can be applied to both downlink and uplink.

As described above, the present disclosure provides a number of valuable features. For example, a signaling method is characterized in that an eNodeB signals to a UE whether or not the PBCH, the SCH and/or CRS (CSI-RS) information exists within a secondary cell. This signaling information can be as simplistic as whether or not the PBCH/SCH/CRS exists. This signaling information may also indicate the bandwidth for CRS/CSI-RS and/or the bandwidth for the UE and/or whether the bandwidth is a partial of the whole bandwidth (of the Scell). The signaling may also indicate one or more CRS/CSI-RS patterns with one or more multiple scrambling code(s) corresponding to one or more virtual cell-IDs.

The UE decodes the signaling to determine whether the PBCH/SCH/CRS exists in the secondary cell, and if it does not exist, additional resource elements can be dynamically allocated to the PDSCH within the secondary cell by using one or more the resource elements of the PBCH, SCH and/or CRS. The signaling may indicate whether there is the control channel and/or which bandwidth has the control channel. The signaling may indicate one or more CRS/CSI-RS patterns corresponding to multiple virtual cell-IDs. However, it is also possible to indicate some CRS/CSI-RS patterns which could not correspond to a virtual cell-ID. In other words, to have more CRS/CSI-RS patterns, maybe there are some CRS/CSI-RS patterns whose scrambling code couldn't be generated by a virtual cell-ID according to the scrambling code generation scheme in Release-8 in addition to the CRS/CSI-RS patterns in Release-10.

The following references are related to subject matter of the present disclosure. Each of these references is incorporated herein by reference in its entirety:

[1] 3GPP TS 36.331, V10.1.0 (2011-03), $3^{RD}$ Generation Partnership Project; Technical Specification Group Radio Access Network; Evolved Universal Terrestrial Radio Access (E-UTRA); Radio Resource Control (RRC); Protocol specification (Release 10);

[2] 3GPP TS 36.213, V10.1.0 (2011-03), $3^{RD}$ Generation Partnership Project; Technical Specification Group Radio Access Network; Evolved Universal Terrestrial Radio Access (E-UTRA); Physical layer procedures (Release 10); and

[3] 3GPP TS 36.211, V10.1.0 (2011-03), $3^{RD}$ Generation Partnership Project; Technical Specification Group Radio Access Network; Evolved Universal Terrestrial Radio Access (E-UTRA); Physical channels and modulation (Release 10).

Although features and elements are described above in particular combinations, each feature or element can be used alone without the other features and elements or in various combinations with or without other features and elements. Some or all of the functions or processes of the one or more of the devices or methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for signaling information to a wireless communications device (UE), the method comprising:
    establishing a primary component carrier cell (Pcell) between a base station and the UE, the Pcell associated with a first component carrier (CC);
    determining whether a secondary component carrier cell (Scell) associated with a second CC includes one or more of at least one of the following in the Scell based at least in part on whether a legacy UE related to the Scell needs to be supported by the Scell: a physical broadcast channel (PBCH), one or more synchronization signals (SCH), or one or more cell-specific reference signals (CRS);
    in response to the CRS not being included in the Scell, transmitting determination information from the base station to the UE via the Pcell, the determination information identifying the Scell, the determination information operable for indicating to the UE an absence of the CRS in the Scell; and
    transmitting user data within one or more resource elements normally associated with the CRS in the Scell.

2. The method in accordance with claim 1 wherein transmitting the determination information to the UE comprises:
    transmitting the determination information using radio resource control (RRC) signaling through the Pcell.

3. The method in accordance with claim 2 wherein transmitting the determination information using RRC signaling comprises at least a one of RRC dedicated signaling or RRC broadcast signaling.

4. The method in accordance with claim 3 wherein transmitting the determination information using RRC signaling comprises:
    transmitting the determination information using RRC dedicated signaling in at least a one of: a master information block (MIB) or a system information block (SIB).

5. The method in accordance with claim 1 wherein the determination information comprises information identifying an allocation of bandwidth resources for the UE to utilize in the Scell.

6. The method in accordance with claim 1 wherein the base station is an evolved Node B device, and the Pcell is compliant with a Long Term Evolution (LTE) standard/specification.

7. The method in accordance with claim 1 further comprising:
    determining the Scell does not include the PBCH and the SCH; and
    assigning one or more resource elements normally associated with the PBCH and the SCH to a physical downlink shared channel (PDSCH) to carry other data.

8. The method in accordance with claim 1 further comprising, in response to at least one of the PBCH or the SCH not being included in the Scell:
    the determination information further operable for indicating to the UE an absence of the at least one of the PBCH or the SCH in the Scell; and
    the transmitting the user data further comprising transmitting the user data within one or more resource elements normally associated with the at least one of the PBCH or the SCH in the Scell.

9. A base station for signaling information and transmitting data to a wireless communications device (UE), the base station comprising:
    a transmitter;

one or more antennas; and
a processor operable to:
    establish a primary component carrier cell (Pcell) associated with a first component carrier (CC) between the base station and the UE,
    determine whether a secondary carrier cell (Scell) established or to be established by the base station includes one or more of at least a one of the following in the Scell based at least in part on whether a legacy UE related to the Scell needs to be supported by the Scell: a physical broadcast channel (PBCH), one or more synchronization signals (SCH), or one or more cell-specific reference signals (CRS),
    in response to the CRS not being included in the Scell, transmit determination information from the base station to the UE via the Pcell, the determination information identifying the Scell and indicating to the UE an absence of the CRS in the Scell, and
    transmit user data within one or more resource elements normally associated with the CRS in the Scell.

10. The base station in accordance with claim 9 wherein the processor is further operable to transmit the determination information using radio resource control (RRC) signaling through the Pcell.

11. The base station in accordance with claim 10 wherein the RRC signaling comprises at least a one of RRC dedicated signaling or RRC broadcast signaling.

12. The base station in accordance with claim 11 wherein the processor is further operable to transmit the determination information using RRC dedicated signaling in at least a one of: a master information block (MIB) or a system information block (SIB).

13. The base station in accordance with claim 9 wherein the determination information comprises information identifying an allocation of bandwidth resources for the UE to utilize in the Scell.

14. The base station in accordance with claim 9 wherein the base station comprises an evolved Node B device compliant with a Long Term Evolution (LTE) standard/specification.

15. The base station in accordance with claim 9 wherein the processor is operable to:
    determine the Scell does not include the PBCH and the SCH; and
    assign one or more resource elements normally associated with the PBCH and the SCH to a physical downlink shared channel (PDSCH) for carrying other data.

16. The base station in accordance with claim 9 further comprising, in response to at least one of the PBCH or the SCH not being included in the Scell:
    the determination information further operable for indicating to the UE an absence of the at least one of the PBCH or the SCH in the Scell; and
    the processor operable to transmit the user data further comprising the processor operable to transmit the user data within one or more resource elements normally associated with the at least one of the PBCH or the SCH in the Scell.

17. A method for dynamically assigning resource elements (REs) within a secondary component carrier cell (Scell) in a wireless communication system, the method comprising:
    establishing a primary component carrier cell (Pcell) between an evolved Node-B (eNodeB) and a user equipment (UE), the Pcell associated with a first component carrier (CC);
    determining, based at least in part on whether a legacy UE related to the Scell needs to be supported by the Scell, whether the Scell includes one or more of at least one of: a broadcast channel assigned a first set of predefined REs, synchronization signals assigned a second set of predefined REs, or reference signals assigned a third set of predefined REs;
    generating determination information by the eNodeB indicating that the Scell does not include the reference signals assigned the third set of predefined REs;
    transmitting the determination information from the eNodeB to the UE via the Pcell;
    assigning one or more of the REs within the third set of predefined REs to a physical downlink shared channel of the Scell enabling the assigned one or more REs to carry data to the UE; and
    transmitting data within the assigned one or more REs via the Scell to the UE.

18. The method in accordance with claim 17 wherein transmitting the determination information comprises:
    transmitting the determination information using radio resource control (RRC) signaling through the Pcell.

19. The method in accordance with claim 17 further comprising:
    the determination information further indicating that the Scell does not include the broadcast channel assigned the first set of predefined REs and the synchronization signals assigned the second set of predefined REs; and
    the assigning the one or more of the REs further comprising assigning the one or more of the REs within the first set and the second set of predefined REs to the physical downlink shared channel of the Scell.

20. The method in accordance with claim 17 further comprising:
    the determination information further indicating that the Scell does not include one or more of the broadcast channel assigned the first set of predefined REs or the synchronization signals assigned the second set of predefined REs; and
    assigning one or more of the REs within one of the first set or the second set of predefined REs to the physical downlink shared channel of the Scell.

* * * * *